United States Patent
Røsok et al.

(10) Patent No.: US 11,971,082 B2
(45) Date of Patent: Apr. 30, 2024

(54) ROPE EXTENSION SYSTEM COMPRISING A ROPE CONNECTOR FOR CONNECTING PREPARED ENDS OF TWO ROPE SEGMENTS, AND A HOISTING SYSTEM COMPRISING SUCH ROPE EXTENSION SYSTEM

(71) Applicant: Grant Prideco, Inc., Houston, TX (US)

(72) Inventors: Nils Øystein Røsok, Kristiansand (NO); Thor Strand, Kristiansand (NO)

(73) Assignee: Grant Prideco, Inc., Houston, TX (US)

(*) Notice: Subject to any disclaimer, the term of this patent is extended or adjusted under 35 U.S.C. 154(b) by 426 days.

(21) Appl. No.: 17/416,317

(22) PCT Filed: Dec. 11, 2019

(86) PCT No.: PCT/NO2019/050271
§ 371 (c)(1),
(2) Date: Jun. 18, 2021

(87) PCT Pub. No.: WO2020/130840
PCT Pub. Date: Jun. 25, 2020

(65) Prior Publication Data
US 2022/0065327 A1    Mar. 3, 2022

(30) Foreign Application Priority Data
Dec. 20, 2018   (EP) .................................... 18214573

(51) Int. Cl.
*F16G 11/04*        (2006.01)
*B66C 13/00*        (2006.01)

(52) U.S. Cl.
CPC .............. *F16G 11/04* (2013.01); *B66C 13/00* (2013.01)

(58) Field of Classification Search
CPC ........ F16G 11/00; F16G 11/04; F16G 11/044; F16G 11/046; F16G 11/048;
(Continued)

(56) References Cited

U.S. PATENT DOCUMENTS 295,252 A * 3/1884 Hutchins ................. F16G 11/00
                                                    24/114.5
297,265 A * 4/1884 Johnson .................. F16G 11/00
                                                    24/114.5
(Continued)

FOREIGN PATENT DOCUMENTS

CA        2193897 A1 *  6/1998
DE         325359 C  *  9/1920
(Continued)

OTHER PUBLICATIONS

EPO Office Action dated Jun. 4, 2021, for Application No. EP18214573.0 (4 pgs.).
(Continued)

*Primary Examiner* — Jonathan P Masinick
(74) *Attorney, Agent, or Firm* — Conley Rose, P.C.

(57) ABSTRACT

A rope connector connects prepared ends of two rope segments, wherein said prepared ends each include a rope eye. The rope connector includes at least two complementary parts, each being configured with a shaped recess for receiving at least part of said prepared end of a respective rope segment. The complementary parts are detachably mountable to each other to establish a firm connection there between. A rope extension system is disclosed to include such rope connector, and a hoisting system employs such rope extension system.

8 Claims, 2 Drawing Sheets

(58) Field of Classification Search
CPC ............... Y10T 403/55; Y10T 403/551; Y10T 403/553; Y10T 403/555; Y10T 24/3991
See application file for complete search history.

(56) References Cited

U.S. PATENT DOCUMENTS

| | | | | |
|---|---|---|---|---|
| 663,605 | A * | 12/1900 | Frankham | ............... F16G 11/00 403/216 |
| 1,028,104 | A * | 6/1912 | Fletcher | ................. H01B 17/12 174/208 |
| 1,443,895 | A | 1/1923 | Harris | |
| 1,710,149 | A * | 4/1929 | Duffy | ..................... F16G 11/03 403/209 |
| 3,379,463 | A * | 4/1968 | Marshall | ............... F16G 11/046 403/209 |
| 2011/0240403 | A1* | 10/2011 | Meillet | ................. F16G 11/025 29/402.08 |
| 2023/0192457 | A1* | 6/2023 | Tønnessen | ............... B66D 1/26 212/270 |

FOREIGN PATENT DOCUMENTS

| | | | |
|---|---|---|---|
| DE | 631423 C | 6/1936 | |
| DE | 2705798 A1 * | 8/1978 | |
| DE | 3343554 A1 | 6/1985 | |
| DE | 9300483 U1 * | 7/1993 | |
| DE | 102020108930 A1 * | 9/2021 | ............ F16G 11/046 |
| FR | 438609 A * | 5/1912 | |
| FR | 1364098 A * | 6/1964 | |
| GB | 2242662 A | 10/1991 | |
| JP | 2009281543 | 12/2009 | |
| KR | 20150020179 A * | 2/2015 | |
| WO | WO-2017102265 A1 * | 6/2017 | |
| WO | 2017/173364 | 10/2017 | |

OTHER PUBLICATIONS

International Search Report for PCT/NO2019/050271 dated Feb. 11, 2020 (3 pages).
Written Opinion for PCT/NO2019/050271 dated Feb. 11, 2020 (5 pages).
IPRP for PCT/NO2019/050271 dated Feb. 11, 2020 (20 pages).
Article 34 Response to Written Opinion dated Jun. 30, 2020 (25 pages).

* cited by examiner

ROPE EXTENSION SYSTEM COMPRISING A ROPE CONNECTOR FOR CONNECTING PREPARED ENDS OF TWO ROPE SEGMENTS, AND A HOISTING SYSTEM COMPRISING SUCH ROPE EXTENSION SYSTEM

CROSS REFERENCE TO RELATED APPLICATIONS

This application is a 35 U.S.C. § 371 national stage application of PCT/NO2019/050271 filed Dec. 11, 2019 and entitled "A Rope Connector For Connecting Prepared Ends Of Two Rope Segments, A Rope Extension System and a Hoisting System Comprising Such Rope Connector", which claims priority to European Patent Application No. 18214573.0 filed Dec. 20, 2018, each of which is incorporated herein by reference in their entirety for all purposes.

STATEMENT REGARDING FEDERALLY SPONSORED RESEARCH OR DEVELOPMENT

Not application

FIELD OF THE DISCLOSURE

The disclosure relates to a rope extension system comprising a rope having a rope connector for connecting prepared ends of two rope segments. The disclosure further relates to a hoisting system comprising such rope extension system.

BACKGROUND OF THE DISCLOSURE

Rope extension systems are known. WO2010/093251A1, owned by the same applicant as the current patent application, discloses a method and a device for hoisting an item at sea with a hoisting device comprises moving the item between a plurality of different height levels. In addition, the method comprises alternately supporting the load of the item with a first hoisting rope and a second hoisting rope while moving the item between the plurality of different height levels. Further, the method comprises arranging the first hoisting rope and the second hoisting rope to extend in parallel along at least part of the distance between the item and the hoisting device. Still further, the method comprises releasably connecting the first hoisting rope to the second hoisting rope. Moreover, the method comprises suspending the second hoisting rope from a hanger when the second hoisting rope is supporting the load of the item. The method also comprises connecting the hanger to an arm of the hoisting device. The second hoisting rope comprises a plurality of ball-shaped connectors along the longitudinal extent thereof, wherein the connectors are structured to fit into the hanger.

The known hoisting system functions well, but has still limitation as regards to its flexibility as regards extension capacity. There is a need to further improve the system.

SUMMARY OF THE DISCLOSURE

The disclosure has for its object to remedy or to reduce at least one of the drawbacks of the prior art, or at least provide a useful alternative to prior art.

In a first aspect the disclosure relates to a rope extension system comprising a rope having at least two rope segments, each rope segment having at least one prepared end comprising a rope eye, the rope extension system further comprising a rope connector, wherein the rope connector connects prepared ends of the at least two rope segments, wherein the rope connector comprises at least two complementary parts, wherein each of said parts is configured with a shaped recess having a shape compliant with the rope eye for receiving at least part of the rope eye of said prepared end of a respective one of said rope segments, and wherein said parts are detachably mountable to each other to establish a firm connection there between that is strong enough to sustain the required tension capacity.

A few definitions and expressions as used throughout this specification are defined hereinafter.

Wherever the word "rope" is used, this is to be interpreted as similar to the words cable and wire.

In an embodiment of the rope extension system in accordance with the disclosure each part of the rope connector comprises a contact surface for contacting the other part when mounted, wherein said contact surfaces are complementarily shaped to counteract relative movement between said parts when a stretching force is applied to the rope. Designing the mutual contact surfaces of each part of the rope connector in that way, leads to a stronger connector and thereby rope with a larger tension tolerance (i.e. increased hoisting capacity) is obtained.

In an embodiment of the rope extension system in accordance with the disclosure said parts of the rope connector are configured to form an engagement surface on at least one end of the connector for engagement with a hang-off locking member. In this embodiment said parts are designed to take full load when resting against a contact surface in the load direction. The contact surface must then have a specific size and shape, which matches the size and shape of the engagement surface. Such configuration makes it possible to transfer all load from the rope connector to a separate load carrying member or structure. In this way the disclosure conveniently allows for designing said rope connector such that a very robust device is obtained, with a clear engagement surface for engagement with the releasable lock and the further lock (hang-off device). Further embodiments of the disclosure will elucidate on this aspect.

In an embodiment of the rope extension system in accordance with the disclosure said parts of the rope connector are mounted together by at least one screw or bolt extending through a hole extending through both parts. This embodiment forms a convenient solution to keep said parts together and provide a strong connector.

In an embodiment of the rope extension system in accordance with the disclosure the rope comprises a fibre rope. The disclosure is particularly useful in rope extension systems using fibre rope. Fibre rope is much lighter than conventional steel ropes, but still offers a large hoisting/pulling capacity. Alternative light-weight materials may be found in the future and may still benefit from the rope connector in accordance with the disclosure.

An embodiment of the rope extension system in accordance with the disclosure comprises a rope drum onto which the rope is wound. The rope extension system of this embodiment forms a convenient standard component that may be used in hoisting applications, such as cranes.

In a second aspect the disclosure relates to a hoisting system for hoisting a load, the hoisting system comprising the rope extension system according to the disclosure. The rope extension system is particularly useful in hoisting systems such as hoisting cranes.

In an embodiment of the hoisting system in accordance with the disclosure the hoisting system (such as a hoisting crane) further comprises a main hoisting system having a main hoisting rope. The rope extension system is configured for extending the main hoisting rope with the rope. The rope extension system further comprises a releasable lock mounted at the end of the main hoisting rope for gripping a respective connector on the rope for transferring the load to the main hoisting rope by lifting the releasable lock. The rope extension system further comprises a further lock provided on the hoisting system for selectively gripping another respective connector on the rope for transferring the load to the rope by lowering the releasable lock. This embodiment constitutes a convenient hoisting crane configuration having the rope extension system, wherein the load can be conveniently transferred between the main hoisting rope and the rope.

BRIEF INTRODUCTION OF THE DRAWINGS

Exemplary embodiments are illustrated in the accompanying drawings, wherein.

DETAILED DESCRIPTION OF THE DISCLOSED EXEMPLARY EMBODIMENTS

Figure 1:
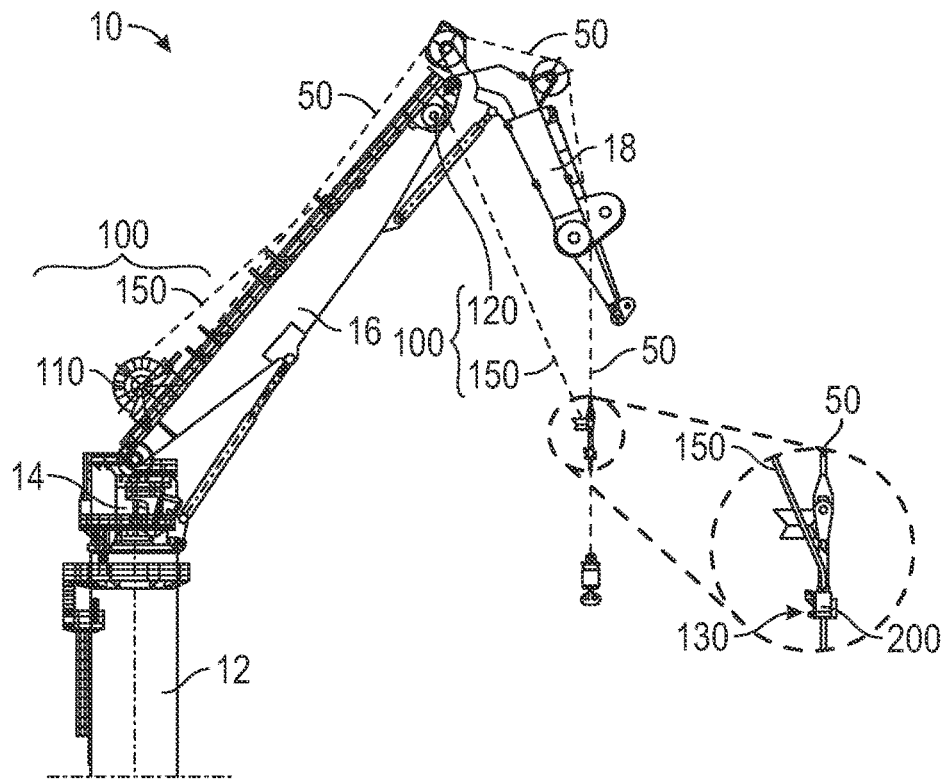
FIG. 1 shows a hoisting crane in accordance with an embodiment of the disclosure.

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The apparatus disclosed is to be used in connection with hoisting systems (i.e. hoisting cranes), where fibre ropes are used for load handling. Part of the disclosure concerns a device (rope connector), which has to different functions, when applied in a hoisting crane. The first function is to get a simplified way to connect fibre ropes together without on-site splicing or modification of the fibre rope. The second function is to use the device for hang-off and transferring of the load from one rope to the other during load handling. In the introductory part of this description it was already discussed that such hang-off and load transferring is typically done in hoisting systems that comprise rope extension systems, wherein a fibre rope is used to extend a steel rope of the main hoisting system of the hoisting crane. The purpose of using a fibre rope is to achieve a more efficient hoisting system, because of reduced weight of the rope compared to traditional steel ropes. Such hoisting crane with rope extension system is known from WO2010/093251A1, the disclosure of which being incorporated herein by this reference.

Figure 2:
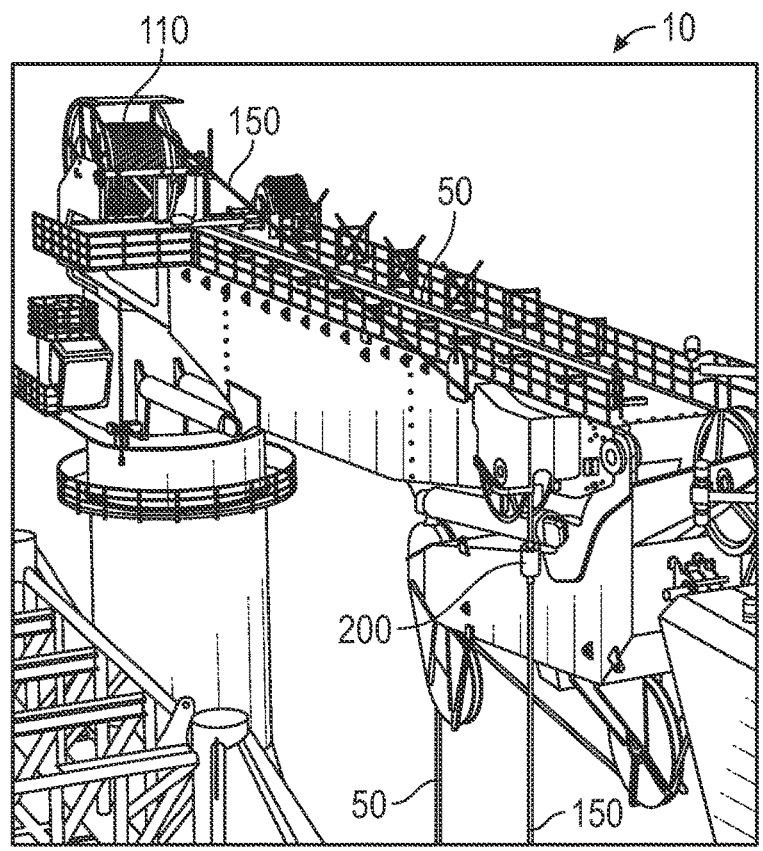
FIG. 2 shows a photo of the same hoisting crane, when provided on a vessel.

FIG. 1 shows a hoisting crane 10 (as an example of a hoisting system) in accordance with an embodiment of the disclosure. FIG. 2 shows a photo of the same hoisting crane, when provided on a vessel. The hoisting crane 10 in this embodiment is a so-called knuckle-boom crane. However, the disclosure is not limited to such type of hoisting cranes. The hoisting crane 10 comprises a crane pedestal 12 onto which the crane base (or king) 14 is placed. A main boom 16 is pivotable mounted to the crane base 14 and a knuckle-boom 18 is connected to an end of the main boom 16. A main rope (steel rope) is fed from the crane base 12 to the tip of the knuckle-boom 18 using winches, sheaves, etc. as is known from the prior art. Up to this point the hoisting crane 10 is similar to the known hoisting cranes 10. The crane 10 further comprises a rope extension system 100 in accordance with the disclosure.

The rope extension system 100 comprises a rope drum 110 onto which a rope (here fibre rope) 150 is wound. The fibre rope 150 comprises of a plurality of rope segments that are connected together by rope connectors 200, of which one is shown in FIGS. 1 and 2. The fibre rope 150 is fed to a hang-off device 120, which has the function of the further lock as mentioned in the claims. The hang-off device 120 comprises a sheave for feeding the fibre rope 150 and a locking system that is to cooperate with the rope connectors 200 on the fibre rope 150. At the end of the main rope 50 there is mounted a releasable lock 130 (travelling connector) that is configured to cooperate with the rope connectors 200 also (yet never at the same time as the hang-off device 120).

If so desired the locking system of the hang-off device 120 can grip and hold the rope connector 200, such that when the main rope 50 is extended, the load of the crane is suspended on the fibre rope 150. In that case the main rope is lowered releasing the releasable lock 130 (traveling connector) from a further rope connector 200, such that the weight of the load hangs on the fibre rope 150 instead.

Figure 3:
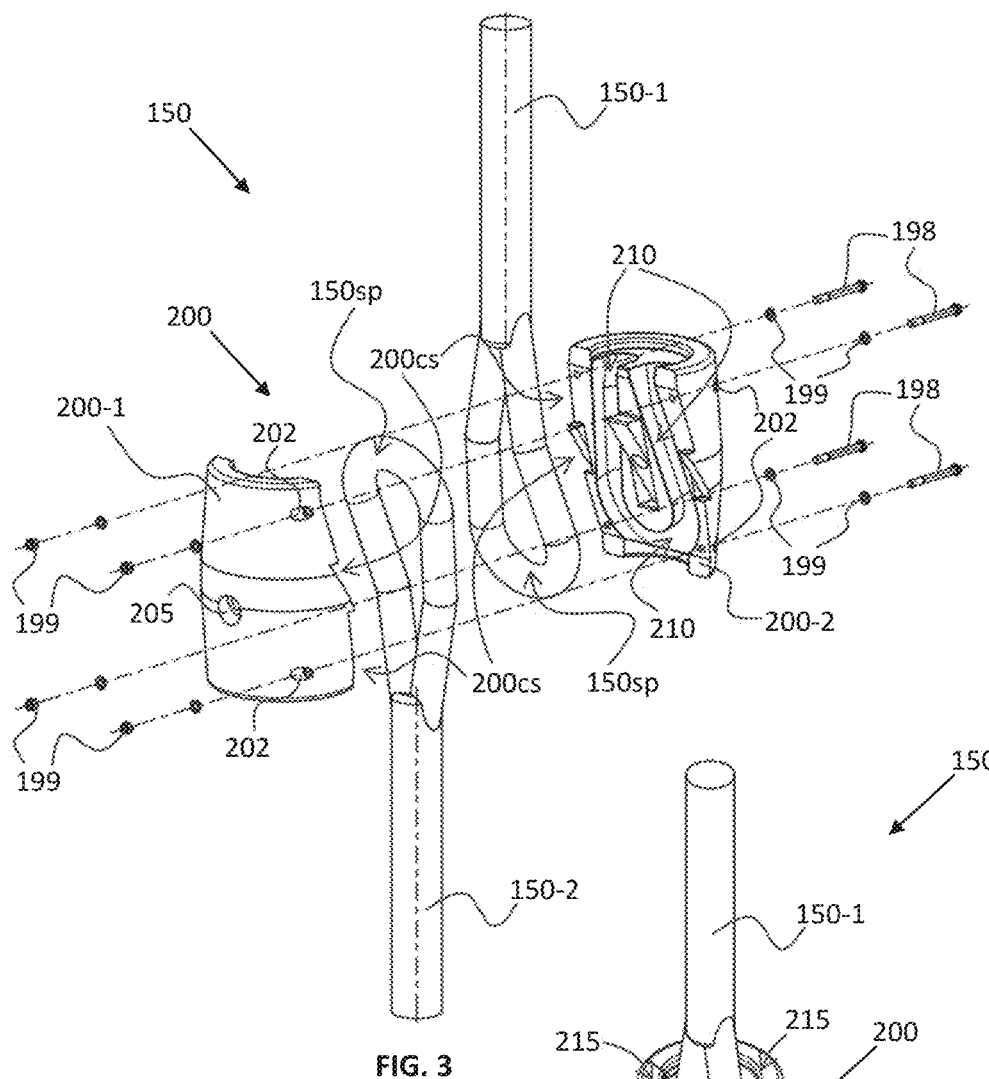
FIG. 3 shows an exploded view of a rope comprising rope segments connected by a rope connector in accordance with the disclosure.
Figure 4:
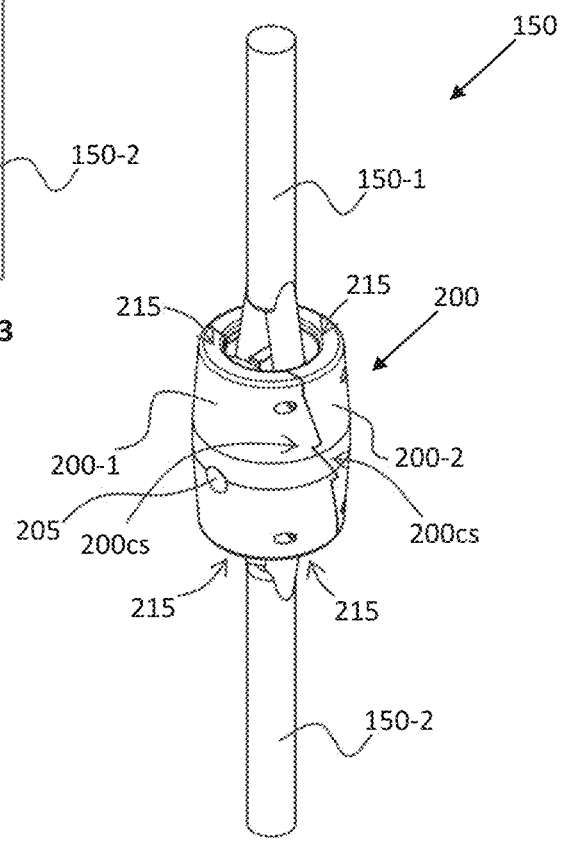
FIG. 4 shows a collapsed view of the rope of FIG. 3.

FIG. 3 shows an exploded view of a rope 150 comprising rope segments 150-1, 150-2 connected by a rope connector 200 in accordance with the disclosure. The figure clearly shows that the rope connector 200 comprises two main parts 200-1, 200-2. Each of said parts 200-1, 200-2 is provided with a recess 210. The recesses 210 are shaped for each receiving a spliced end 150$sp$ of a rope segment 150-1, 150-2. As an alternative to the spliced ends of said rope segments, other types of prepared ends may be used also, as long as they comprise a rope eye. The disclosure applies at least to the following prepared ends (also referred to as terminations): splice, thimble, end bond, stitched termination, and swaging. All of these terminations comprise a rope eye in some form or the other. The respective parts 200-1, 200-2 are provided with a plurality of holes 202 that extend through the rope connector 200 and are configured for receiving a bolt 198 and nut 199 assembly as illustrated. In the current example a plurality of nuts 199 is provided on each bolts 198 in order to obtain a very firm connection. In this example there are provided four holes and four nut and bolt assemblies (198, 199), but this may also be any other number. FIG. 3 further illustrates how said parts 200-1, 200-2 are complementarily shaped with contact surfaces 200cs which results in a large friction in the axial direction, when the rope connector 200 is mounted together as shown in FIG. 4, which shows a collapsed view of the rope of FIG. 3. FIG. 4 clearly shows how said parts 200-1, 200-2 grip into each other at their contact surfaces 200cs. A further bolt hole 205 is provided for allowing an larger bolt and nut (not shown) to be inserted for establishing an even stronger connection between said parts 200-1, 200-2.

The disclosure comprises a splittable rope connector 200 that allows for connecting two or more rope segments 150-1, 150-2 together. The rope connector enables ropes to be extended by connecting various rope segments 150-1, 150-2 together to a final desired length. The rope connector 200 comprises of two splittable parts 200-1, 200-2 that may be easily separated from each other such that pre-spliced ropes may be put into recesses in said parts. This can be virtually done on any site. The load will be transferred between the rope segments through the rope connector. The splittable parts 200-1, 200-2 of the rope connector 200 are preferably interlocking with each other as shown in FIGS. 3 and 4. Said parts 200-1, 200-2 may be mounted and kept together by bolts 198 (extending through holes that extend through both parts) that are used for securing the position of said two parts. The rope connector may be advantageously used in a rope extension system in a crane 10 by making it cooperate with both a releasable lock 130 (traveling connector) and a further lock 120 (hang-off device) allowing transferring of the load between the main hoisting rope and the rope. To that extent the rope connector 200 has been designed with a robust contact surface 215 (on one or both sides) that serves to cooperate with the further lock 120 (hang-off device) and can stand very high pressures. In one embodiment of the disclosure this further lock 120 (hang-off locking member) may be a fork-structure (not shown) that presses against said contact surface 215 for holding the rope connector 200 in place (load transferred to the (fibre) rope 150).

The particular embodiments disclosed above are illustrative only, as the disclosure may be modified and practiced in different but equivalent manners apparent to those skilled in the art having the benefit of the teachings herein. For example, the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope of the disclosure. Accordingly, the protection sought herein is as set forth in the claims below.

It should be noted that the above-mentioned embodiments illustrate rather than limit the disclosure, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. In the device claim enumerating several means, several of these means may be embodied by one and the same item of hardware.

The invention claimed is:

1. A rope extension system comprising a rope having at least two rope segments each rope segment having at least one prepared end comprising a rope eye, the rope extension system further comprising a rope connector, wherein the rope connector connects the prepared ends of the at least two rope segments, wherein the rope connector comprises at least two complementary parts, wherein each of said complementary parts is configured with a shaped recess having a shape compliant with the rope eye for receiving at least part of the rope eye of said prepared end of a respective one of said rope segments, and wherein said complementary parts are detachably mountable to each other to establish a connection there between.

2. The rope extension system according to claim 1, wherein each complementary part of the rope connector comprises a contact surface for contacting the other part when mounted, wherein said contact surfaces are complementarily shaped to counteract relative movement between said parts when a stretching force is applied to the rope.

3. The rope extension system according to claim 1, wherein said complementary parts of the rope connector are configured to form an engagement surface on at least one end of the connector for engagement with a hang-off locking member.

4. The rope extension system according to claim 1, wherein said complementary parts of the rope connector are mounted together through at least one screw or bolt mounted in a hole extending through both complementary parts.

5. The rope extension system according to claim 1, wherein the rope comprises a fibre rope.

6. The rope extension system according to claim 1, further comprising a rope drum onto which the rope is wound.

7. A hoisting system for hoisting a load, the hoisting system comprising the rope extension system according to claim 1.

8. The hoisting system according to claim 7, wherein the hoisting system further comprises a main hoisting system having a main hoisting rope, the rope extension system being configured for extending the main hoisting rope with the rope, wherein the rope extension system further comprises: i) a releasable lock mounted at the end of the main hoisting rope for gripping a respective connector on the rope for transferring the load to the main hoisting rope by lifting the releasable lock, and ii) a further lock provided on the hoisting system for selectively gripping another respective connector on the rope for transferring the load to the rope by lowering the releasable lock.

* * * * *